(12) United States Patent
Mackay et al.

(10) Patent No.: US 8,782,548 B2
(45) Date of Patent: Jul. 15, 2014

(54) WORKFLOW-BASED DELIVERY MANAGEMENT METHODS AND SYSTEMS

(75) Inventors: Eric Mackay, Colorado Springs, CO (US); Hrushikesh K. Dingari, Tampa, FL (US); Todd E. Kercher, Highlands Ranch, CO (US); Jagdishbhai B. Patel, Colorado Springs, CO (US); Ravindra M. Thomare, Broadlands, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 306 days.

(21) Appl. No.: 13/310,070

(22) Filed: Dec. 2, 2011

(65) Prior Publication Data
US 2013/0145300 A1 Jun. 6, 2013

(51) Int. Cl.
*G06F 3/048* (2013.01)
*G06F 3/00* (2006.01)
*G06F 3/0481* (2013.01)
*G11B 27/34* (2006.01)

(52) U.S. Cl.
CPC .............. *G06F 3/0481* (2013.01); *G11B 27/34* (2013.01)
USPC ........................... 715/772; 715/716; 715/781

(58) Field of Classification Search
USPC .......................................... 715/772, 716, 781
See application file for complete search history.

(56) References Cited

U.S. PATENT DOCUMENTS

| | | | |
|---|---|---|---|
| 6,839,745 B1 * | 1/2005 | Dingari et al. | 709/219 |
| 7,139,800 B2 * | 11/2006 | Bellotti et al. | 709/206 |
| 7,426,654 B2 * | 9/2008 | Adams et al. | 714/4.3 |
| 7,454,466 B2 * | 11/2008 | Bellotti et al. | 709/206 |
| 7,525,422 B2 * | 4/2009 | Bishop et al. | 340/522 |
| 7,716,077 B1 * | 5/2010 | Mikurak | 705/7.12 |
| 8,514,082 B2 * | 8/2013 | Cova et al. | 340/572.1 |
| 8,554,579 B2 * | 10/2013 | Tribble et al. | 705/3 |
| 2009/0138340 A1 * | 5/2009 | Borr et al. | 705/11 |
| 2009/0235194 A1 * | 9/2009 | Arndt et al. | 715/772 |

* cited by examiner

*Primary Examiner* — David Phantana Angkool

(57) ABSTRACT

An exemplary method includes a delivery management system 1) receiving data representative of an order to deliver a network circuit-based product to a customer, 2) tracking completion statuses of each of a plurality of workflow steps associated with the delivery of the network circuit-based product and each of a plurality of milestones each representing a distinct level of completion of the order, 3) automatically identifying, based on the tracked completion statuses, one or more workflow jeopardy conditions that affect a completion of one or more of the milestones, and 4) providing one or more notifications of the one or more workflow jeopardy conditions for presentation within a graphical user interface to a user assigned to the order. Corresponding methods and systems are also disclosed.

24 Claims, 14 Drawing Sheets

Detailed Order View

View Criteria — 802

| | | |
|---|---|---|
| View For | :John Doe | CDDD RangeBegin 09-21 |
| Line of Business | :OPTION2 | CDDD RangeEnd 10-21 |
| Order Type | Install | |

Milestones — 804

| Order Entry | Path Determination | Approval | Commit Date to Customer | Builds | Circuit Provisioning |
|---|---|---|---|---|---|
| 09-07 | Partial | | 09-08 | N/A | |
| 806-1 | 806-2 | 806-3 | 806-4 | 806-5 | 806-6 |
| Network Routing and Activation | Third Party | CPE | Test and Activation | Order Completion | |
| 09-08 | Partial | | | | |
| 806-7 | 806-8 | 806-9 | 806-10 | 806-11 | |

Orders Assigned to Delivery Manager

| Order Number | Network Circuit ID | Customer Requested Delivery Date |
|---|---|---|
| 123 | B87654321 | 12/13 |
| 124 | M12341234 | 12/15 |
| 129 | J12345678 | 12/1 |
| 147 | J12345678 | 12/7 |
| 158 | B87654321 | 12/22 |
| 159 | J12345678 | 12/12 |
| 175 | M12341234 | 12/15 |
| 181 | M12341234 | 12/19 |
| 183 | J12345678 | 12/18 |
| 192 | J12345678 | 12/18 |
| 194 | B87654321 | 12/1 |

Fig. 10

Alarms for Order No. 123

| Alarm Code | Alarm Description | Alarm Name | Priority | Clearable | Created Date | Date Closed |
|---|---|---|---|---|---|---|
| ABCD | Task Get-Optimal-Path does not complete 1 DAY after Get-Optimal-Path Start | No Access Path Provided within SLA | 0 | YES | 12/13 | 12/13 |
| EFGH | Issue 1 | Missed Milestone: Late Access Loop | 0 | NO | 12/15 | |
| HIJK | Issue 2 | Order Status | 1 | NO | 12/14 | |
| LMNO | Issue 3 | Missed Milestone: Loop FOC Date | 1 | YES | 12/7 | 12/8 |

Fig. 11

WORKFLOW-BASED DELIVERY MANAGEMENT METHODS AND SYSTEMS

BACKGROUND INFORMATION

Delivery of a network circuit-based product (e.g., a private internet protocol ("PIP") service or product, a switched circuit service or product, an Internet-based service or product, or a telecommunication-based service or product) to a customer by a network provider typically involves collaboration and coordination between numerous people, systems, and workflow processes. Failure by a particular person and/or system to perform one or more tasks associated with the delivery of the network circuit-based product may jeopardize the ability of one or more other people and/or systems involved in the delivery of the network circuit-based product to complete the tasks assigned to them. This, in turn, may result in delayed delivery of the network circuit-based product, a dissatisfied customer, and lost revenue for the network provider.

Unfortunately, because there are so many people, systems, and processes involved in delivering a network circuit-based product, it is currently difficult for a delivery manager (i.e., a person assigned to oversee the delivery of the network circuit-based product) to readily identify conditions that have the potential to jeopardize completion of one or more workflow steps involved in the delivery of the network circuit-based product. Hence, by the time such conditions are discovered, they may have already negatively impacted the ability of one or more people and/or systems to perform their assigned tasks.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 6-12 illustrate various graphical user interfaces ("GUIs") that may be displayed according to principles described herein.

DETAILED DESCRIPTION OF PREFERRED EMBODIMENTS

Figure 1:
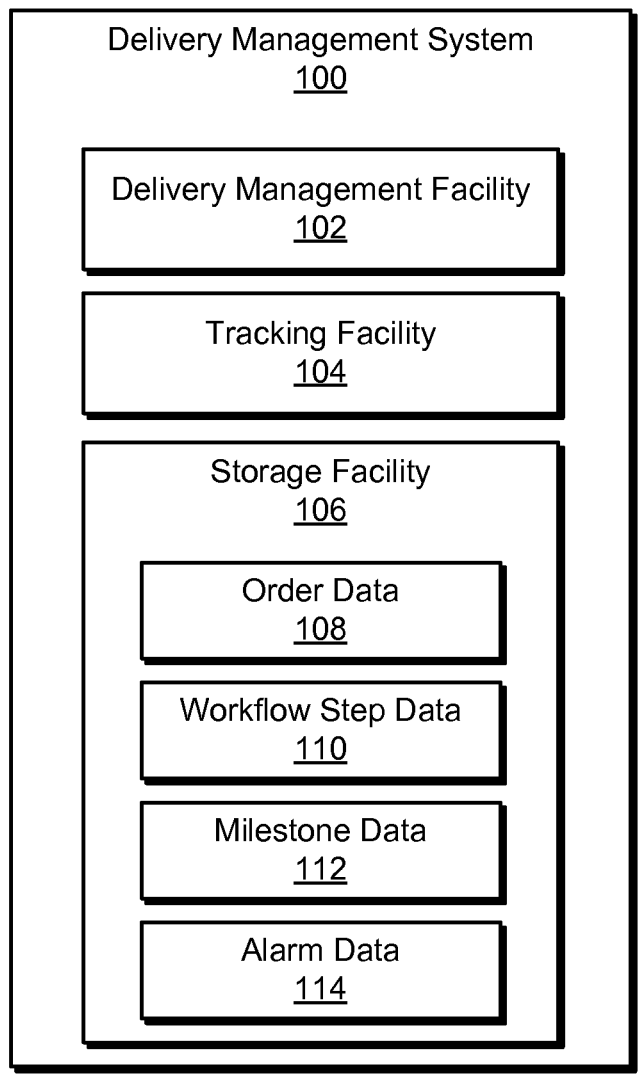
FIG. 1 illustrates an exemplary delivery management system according to principles described herein.

Workflow-based delivery management methods and systems are described herein. As will be described below, a delivery management system may 1) receive data representative of an order to deliver a network circuit-based product to a customer, 2) track completion statuses of each of a plurality of workflow steps associated with the delivery of the network circuit-based product and each of a plurality of milestones each representing a distinct level of completion of the order, 3) automatically identify, based on the tracked completion statuses, one or more workflow jeopardy conditions that affect a completion of one or more of the milestones, and 4) provide one or more notifications of the one or more workflow jeopardy conditions for presentation within a graphical user interface ("GUI") to a user (e.g., a delivery manager) assigned to the order.

As used herein, a "network circuit" refers to any network-based communication path and associated components that may be provided by, used by, and/or otherwise associated with a network provider and/or customer of the network provider. For example, a network circuit may include a telecommunication circuit, a dedicated circuit, a switched circuit, an analog circuit, a digital circuit, a network path for a local area network, a digital signal ("DS") circuit (e.g., a T1, T2, or T3 line), and/or any other network-based communication path and associated components as may serve a particular implementation.

A "network circuit-based product" refers to any service or product associated with a network circuit and that may be offered (e.g., for sale or lease) by a network provider and/or any other entity to one or more customers. Exemplary network circuit-based products include, but are not limited to, private internet protocol ("PIP") services and products, switched circuit services and products, Internet-based services and products, telecommunication-based services and products, and synchronous optical networking ("SONET")-based services and products.

As used herein, a "workflow step" refers to a particular workflow process involved in delivering a network circuit-based product to a customer. Each workflow step includes one or more "workflow tasks," which refer to specific procedures, jobs, and/or tasks that are followed or completed in order to complete each workflow step.

Delivery of a network circuit-based product to a customer may require completion of a plurality of workflow steps. For example, a delivery of a network circuit-based product to a customer may require completion of one or more workflow steps associated with an order entry workflow process (e.g., a workflow process used to accept, assign, and/or otherwise process an order to deliver the network circuit-based product to the customer), one or more workflow steps associated with a provisioning workflow process (e.g., a workflow process used to install, disconnect, establish, initiate, repair, and/or otherwise modify a network circuit), one or more workflow steps associated with a post-provisioning workflow process associated with the order (e.g., a workflow process used to maintain and/or service the network circuit after it has been provisioned), one or more workflow steps associated with a billing workflow process (e.g., a workflow process used to bill the customer for the delivery of the network circuit-based product), one or more workflow steps associated with an additional order related to the order for the delivery of the network circuit-based product (e.g., a workflow process used to process an order to concurrently deliver another service or product to the customer at the same time as the network circuit-based product), and/or one or more workflow steps associated with an external workflow process performed by a third party separate from a provider (e.g., a network provider) of the network circuit-based product (e.g., a workflow process used by the third party to install equipment to be used in conjunction with the network circuit-based product).

As shown, the number of workflow steps that may have to be performed in order to deliver a network circuit-based product to a customer may be expansive and may span a number of different workflow processes performed by disparate people, departments, companies, entities, and/or systems. Advantageously, the methods and systems described herein may provide end-to-end visibility by a user (e.g., a delivery manager) into the potentially many underlying workflow steps associated with completing an order to deliver a network circuit-based product to a customer. For example, the methods and systems described herein may associate the workflow steps associated with completing the order with a number of high level milestones, which represent various completion levels of the order and which allow the user to readily ascertain an overall completion status of the order. In some examples, the methods and systems may also present the user with preemptive notifications (i.e., alarms) of workflow jeopardy conditions that may affect a completion of one or more of the high level milestones. The user may then take one or more appropriate actions to remedy or otherwise address the workflow jeopardy conditions, thereby minimizing (or, in some cases, eliminating) any detrimental effect the workflow jeopardy conditions may have on the overall process of completing the order. This, in turn, may allow a network provider to provide more efficient, effective, and profitable service to its customers.

FIG. 1 illustrates an exemplary delivery management system 100 ("system 100"). As shown, system 100 may include, without limitation, a delivery management facility 102, a tracking facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Delivery management facility 102 may be configured to perform one or more delivery management operations as may serve a particular implementation. For example, delivery management facility 102 may receive data representative of an order to deliver a network circuit-based product to a customer (an "order"). The data representative of the order may be received in any suitable manner. For example, the data may be received from an order entry system that processes a request provided by a customer to install a particular service or product associated with a particular network circuit (e.g., a request to install a PIP service that utilizes a dedicated T1 network circuit). Additional operations that may be performed by delivery management facility 102 will be described in more detail below.

Delivery management facility 102 may be further configured to associate (e.g., link) a plurality of workflow steps involved in the delivery of the network circuit-based product with a plurality of milestones each representing a distinct level of completion of the order. Association of one or more workflow steps with a particular milestone may result in the completion status of the milestone depending on the completion statuses of the one or more workflow steps.

Figure 2:
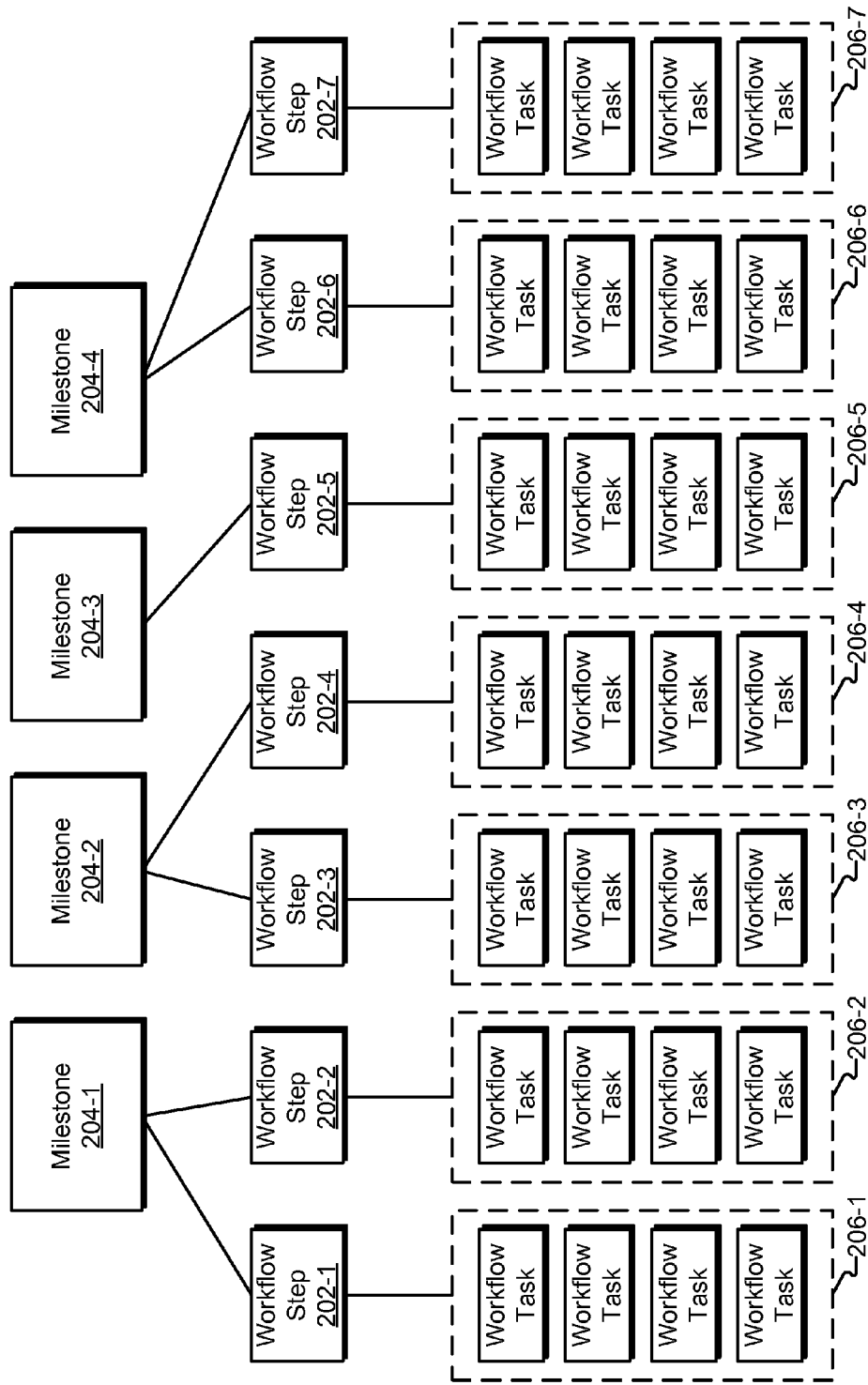
FIG. 2 shows an exemplary association of a plurality of workflow steps with a plurality of milestones according to principles described herein.

To illustrate, FIG. 2 shows an exemplary association of a plurality of workflow steps 202 (e.g., workflow steps 202-1 through 202-7) with a plurality of milestones 204 (e.g., milestones 204-1 through 204-4). As shown, one or more workflow steps 202 may be associated with each milestone 204. For example, FIG. 2 shows that workflow steps 202-1 and 202-2 are associated with milestone 204-1, workflow steps 202-3 and 202-4 are associated with milestone 204-2, workflow step 202-5 is associated with milestone 204-3, and workflow steps 202-6 and 202-7 are associated with milestone 204-4. Seven workflow steps 202 and four milestones 204 are shown in FIG. 2 for illustrative purposes only. Any other number of workflow steps 202 and milestones 204 may be associated with an order as may serve a particular implementation.

FIG. 2 also shows that each workflow step 202 may include a plurality of workflow tasks 206 (e.g., workflow tasks 206-1 through 206-7). As described above, a workflow task 206 refers to a specific procedure, job, or task that is to be followed or completed in order to at least partially complete a corresponding workflow step 202.

Each workflow task 206, workflow step 202, and milestone 204 may have a corresponding "completion status," which indicates whether or not the workflow task 206, workflow step 202, or milestone 204 has been completed. For example, a particular workflow task 206, workflow step 202, or milestone 204 may have a completion status of "fully complete" if it has been fully completed, a completion status of "partially complete" if it has been partially completed, or a completion status of "incomplete" if it has not been completed at all. Other completion statuses (e.g., "canceled" and/or "not ready") may be associated with each workflow task 206, workflow step 202, or milestone 204 as may serve a particular implementation.

As illustrated by the associations shown in FIG. 2, a completion status of a particular workflow step 202 depends on a completion status of its corresponding workflow tasks 206. For example, workflow step 202-1 may have a completion status of "fully complete" if all of workflow tasks 206-1 have been completed, "partially complete" if only some of workflow tasks 206-1 have been completed, or "incomplete" if none of workflow tasks 206-1 have been completed. Likewise, a completion status of a particular milestone 204 depends on a completion status of its associated workflow step(s) 202. For example, milestone 204-1 may have a completion status of "fully complete" if both workflow steps 202-1 and 202-2 have been fully completed, "partially complete" if one or both of workflow steps 202-1 and 202-2 have only been partially completed, or "incomplete" if neither workflow step 202-1 nor workflow step 202-2 has been competed at all.

In some examples, milestones 204 are universal to a variety of different network circuit-based products that may be delivered by a particular network provider. In other words, even though different network circuit-based products may have different workflow steps 202 associated therewith, they have the same milestones 204 associated therewith. In this manner, the same milestones 204 may be used to track a completion status of disparate types of orders.

Delivery management facility 102 may associate a plurality of workflow steps with a plurality of milestones each representing a distinct level of completion of an order to deliver a network circuit-based product to a customer in any suitable manner. For example, association of the workflow steps with the milestones may be performed in response to manual input provided by the user. To this end, delivery management facility 102 may be configured to provide a GUI configured to facilitate manual association by the user of the workflow steps with the milestones.

Alternatively, delivery management facility 102 may detect one or more attributes of the order and automatically associate each workflow step with a particular milestone included in the plurality of milestones based on the detected one or more attributes of the order. For example, delivery management facility 102 may detect that the order is for a particular type of network circuit-based product. Delivery management facility 102 may then automatically associate the workflow steps with the milestones in accordance an association heuristic corresponding to the detected product type.

It will be recognized that the association between the workflow steps and the milestones may be performed at any suitable time in relation to delivery management facility 102 receiving the order. For example, delivery management facility 102 may perform the association before the order is received (e.g., by establishing an association heuristic corresponding to a particular type of network circuit-based product). Alternatively, delivery management facility 102 may perform the association in response to receiving the order. Exemplary associations between workflow steps and milestones will be described in more detail below.

Returning to FIG. 1, once an order has been received by delivery management facility 102, tracking facility 104 may track completion statuses of each of a plurality of workflow steps associated with the delivery of the network circuit-based product and each of a plurality of milestones that each represent a distinct level of completion of the order. This may be performed in any suitable manner. For example, tracking facility 104 may track the completion statuses of the workflow steps and the milestones by tracking a completion status of one or more workflow tasks included in each of the workflow steps.

In some examples, tracking facility 104 may facilitate tracking of completion statuses of workflow tasks, workflow steps, and/or milestones by providing one or more tracking GUIs for presentation to one or more users assigned to complete the workflow tasks, workflow steps, and/or milestones. The one or more tracking GUIs may allow the users to enter one or more target completion dates, actual completion dates, and/or any other type of tracking information associated with the workflow tasks, workflow steps, and/or milestones.

In some examples, tracking facility 104 may automatically detect one or more actual completion dates based on one or more activities performed by the users. For example, tracking facility 104 may automatically detect a completion date of a particular milestone based one or more user-provided completion dates of one or more associated workflow steps.

Delivery management facility 102 may be further configured to automatically identify, based on the tracked completion statuses, one or more workflow jeopardy conditions that affect a completion of one or more of the milestones associated with the order. As used herein, a "workflow jeopardy condition" refers to a condition associated with a milestone, workflow step, and/or workflow task that may jeopardize or negatively impact a completion status of one or more milestones (e.g., a condition that prevents one or more milestones from being completed by a customer desired due date ("CDDD") and/or a commit due date ("CDD")). For example, a workflow jeopardy condition may include a delay in a particular workflow step or task being performed, an error made by a person, entity, or system while performing a particular workflow task, a cancellation of a related order, a problem with a related piece of equipment, an absence of a particular user in charge of completing a particular workflow task, a weather-related condition that may prevent a particular workflow task from being performed, and/or any other condition that may jeopardize a completion status of one or more milestones associated with an order.

In some examples, the one or more workflow jeopardy conditions identified by delivery management facility 102 may include a workflow jeopardy condition that is actually affecting a completion of one or more milestones (e.g., by affecting a completion of one or more workflow steps associated with the one or more milestones) at the time that the one or more workflow jeopardy conditions are identified. Additionally or alternatively, the one or more workflow jeopardy conditions identified by delivery management facility 102 may include a workflow jeopardy condition that has the potential of affecting a completion of one or more milestones (e.g., by affecting a completion of one or more workflow steps associated with the one or more milestones) subsequent to the identification of the one or more workflow jeopardy conditions.

Delivery management facility 102 may be further configured to provide one or more notifications of the one or more workflow jeopardy conditions for presentation within a GUI to a user (e.g., a delivery manager) assigned to the order. The user may then take one or more appropriate actions to remedy or otherwise address the workflow jeopardy conditions, thereby minimizing (or, in some cases, eliminating) any detrimental effect the workflow jeopardy conditions may have on the overall process of completing the order. Exemplary manners in which such notifications (also referred to herein as "alarms") may be presented within a GUI will be provided below.

Delivery management facility 102 may be further configured to perform one or more other operations associated with an order to deliver a network circuit-based product to a customer. For example, once an order has been received by delivery management facility 102, delivery management facility 102 may assign the order to a user (e.g., a delivery manager). The assignment of the order may be performed in any suitable manner. For example, delivery management facility 102 may automatically assign the order to the user based on one or more attributes of the order. To illustrate, orders of a particular type and/or bandwidth may be assigned to a user who specializes in the particular order type and/or bandwidth.

As another example, delivery management facility 102 may provide a GUI that includes a list of orders assigned to a particular user. In response to the user selecting one of the orders included in the list of orders, delivery management facility 102 may provide various types of information related to the selected order for presentation within the GUI. For example, delivery management facility 102 may provide a graphical depiction of a plurality of milestones associated with the order for presentation within the GUI and graphically indicate a presence of one or more workflow jeopardy conditions that affect a completion of one or more of the milestones. An example of this will be provided below.

Figure 3:
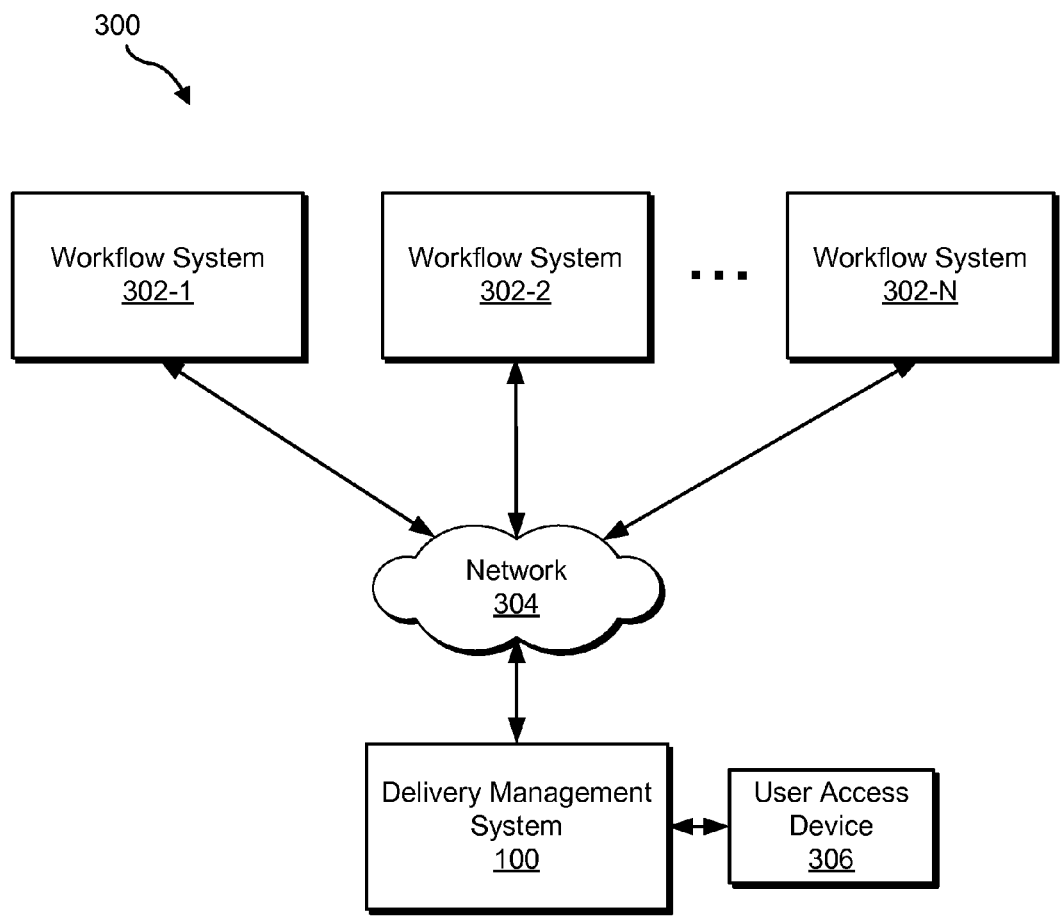
FIG. 3 illustrates an exemplary configuration wherein the delivery management system of FIG. 1 is communicatively coupled to a plurality of workflow systems according to principles described herein.

FIG. 3 illustrates an exemplary configuration 300 wherein delivery management system 100 is communicatively coupled to a plurality of workflow systems 302 (e.g., workflow systems 302-1 through 302-N). Each of the workflow systems 302 may include any combination of computing devices configured to implement or perform one or more workflow steps and/or workflow tasks overseen by delivery management system 100. For example, workflow systems 302 may include one or more computing devices configured to perform and/or otherwise be involved with a completion of an order entry workflow process associated with an order, a provisioning workflow process associated with the order, a post-provisioning workflow process associated with the order, a billing workflow process associated with the order, a workflow process associated with one or more orders related to the order, and/or an external workflow process associated with the order.

Figure 4:
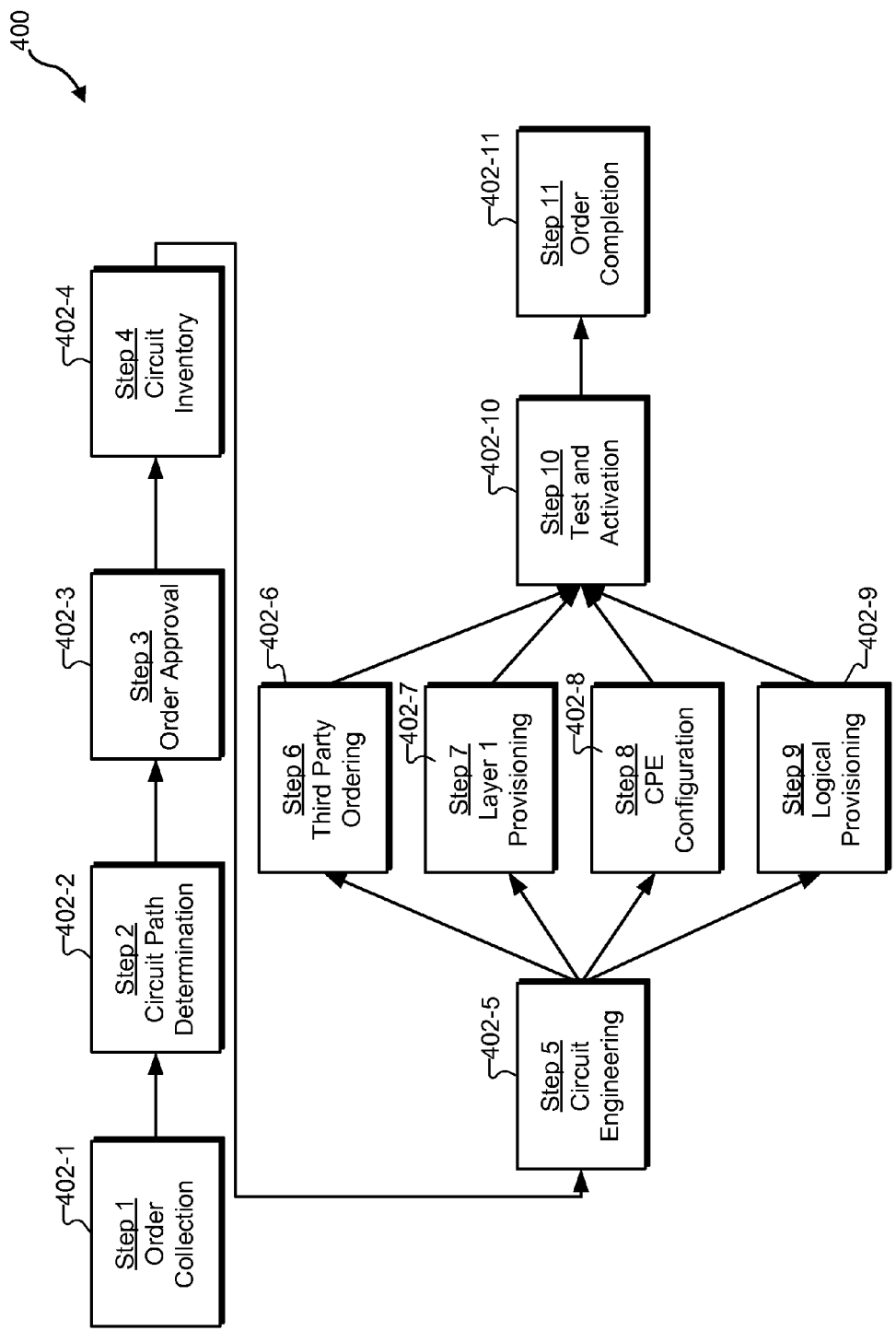
FIG. 4 illustrates an exemplary provisioning workflow according to principles described herein.

To illustrate, one of workflow systems 302 may be associated with a provisioning workflow used to provision a network circuit associated with a network circuit-based product. FIG. 4 illustrates an exemplary provisioning workflow 400 that includes a plurality of workflow steps 402 (e.g., workflow steps 402-1 through 402-11). For example, provisioning workflow 400 may include an order collection step 402-1, a circuit path determination step 402-2, an order approval step 402-3, a circuit inventory step 402-4, a circuit engineering step 402-5, a third party ordering step 402-6, a layer one provisioning step 402-7, a customer premises equipment configuration step 402-8, a logical provisioning step 402-9, a test and activation step 402-10, and an order completion step 402-11. Each of these workflow steps 402 will now be briefly described.

Order collection step 402-1 may include one or more workflow tasks configured to facilitate receiving, validating, and/or initiating a request to provision a network circuit. For example, workflow tasks associated with order collection step 402-1 may be configured to facilitate receipt of an order for a network circuit-based product associated with the network circuit, collection of information about the ordering customer, collection of information about the ordered service or product, collection of information about one or more logistics of provisioning the network circuit that are specific to the particular customer, and/or perform any other procedure associated with collection of an order for a network circuit-based product.

Circuit path determination step 402-2 may include one or more workflow tasks configured to facilitate determination of a physical and/or logistic path associated with a network circuit. For example, workflow tasks associated with circuit path determination step 402-2 may be configured to facilitate, either internally within the provider's network or by way of calls to third party applications or systems, the building of an end-to-end path that the network circuit will take through one or more networks in order to provide the requested network circuit-based product. Workflow tasks associated with circuit path determination step 402-2 may be additionally or alternatively configured to derive one or more engineering parameters needed to perform layer one through three provisioning for the network circuit.

Order approval step 402-3 may include one or more workflow tasks configured to facilitate approval of the order collected in order collection step 402-1. For example, workflow tasks associated with order approval step 402-3 may be configured to approve information collected in order collection step 402-1, commit to the circuit path determined in circuit path determination step 402-2, and/or approve any changes made to an order after it is initially requested.

Circuit inventory step 402-4 may include one or more workflow tasks configured to facilitate performance of one or more inventory procedures related to the requested network circuit. For example, workflow tasks associated with circuit inventory step 402-4 may be configured to access, create, and/or update one or more entries in an inventory database in order to ensure availability of equipment and/or resources necessary to provision the network circuit. Workflow tasks associated with circuit inventory step 402-4 may be additionally or alternatively configured to assign the network circuit to one or more high-level parent facilities and/or otherwise associate the network circuit with one or more other entities.

Circuit engineering step 402-5 may include one or more workflow tasks configured to facilitate derivation of engineering data associated with the provisioning of the network circuit. For example, workflow tasks associated with circuit engineering step 402-5 may be configured to facilitate derivation of order, circuit, and customer drop level engineering data needed by one or more business functions that support one or more subsequent workflow steps (e.g., workflow steps 402-6 through 402-9).

Third party ordering step 402-6 may include one or more workflow tasks configured to facilitate coordination with one or more third party entities in order to complete an order for a particular network circuit-based product. To illustrate, circuit path determination step 402-2 may determine that a portion of the network path is to pass through a third party network. Hence, workflow tasks associated with third party ordering step 402-6 may be configured to acquire permission to pass through the third party network, coordinate provisioning of the third party network, and/or perform any other action associated with the third party network as may serve a particular implementation.

Layer one provisioning step 402-7 may include one or more workflow tasks configured to facilitate Open Systems Interconnection ("OSI") layer one provisioning. For example, workflow tasks associated with layer one provisioning step 402-7 may be configured to request and manage creating, changing, and/or dropping of a service from an internal physical OSI layer one network management system for one or more portions of the network circuit that will be carried on the internal network.

Customer premises equipment configuration step 402-8 may include one or more workflow tasks configured to configure or otherwise manage customer premises equipment associated with the network circuit. For example, workflow tasks associated with customer premises equipment configuration step 402-8 may be configured to manage a progress of ordering, configuring, procuring, shipping, delivering, and/or installing equipment at the customer premises that will be used to support the network circuit being provisioned.

Logical provisioning step 402-9 may include one or more workflow tasks configured to facilitate provisioning of an internal logical (e.g., OSI layers two and three) network management system. For example, workflow tasks associated with logical provisioning step 402-9 may be configured to manage a progress of creating, changing, or dropping a service from internal logic (e.g., OSI layers two and/or three) for portions of the network circuit that will be carried on an internal network that supports logical routing services and protocols (e.g., TCP/IP, frame relay, Ethernet, etc.).

Test and activation step 402-10 may include one or more workflow tasks configured to facilitate testing and/or activation of an established network circuit. For example, workflow tasks associated with test and activation step 402-10 may be configured to request and manage a progress of one or more tests performed on the network circuit and/or an activation of the network circuit.

Order completion step 402-11 may include one or more workflow tasks configured to facilitate completion of an order. For example, workflow tasks associated with order completion step 402-11 may be configured to notify one or more external systems or personnel that the provisioning of network circuit is complete and that no further actions may be taken with regard to provisioning the circuit without the submission of a new order. In some examples, when order completion step 402-11 has been completed, other functions associated with the network circuit may be performed. For example, completion of order completion step 402-11 may trigger a commencement of billing for the network circuit-based product.

The workflow steps 402 illustrated in FIG. 4 are merely illustrative of the many different workflow steps that may be performed by a particular workflow system 302. It will be recognized that one or more other workflow systems 302 may be configured to perform one or more workflow steps associated with one or more other types of workflow processes involved in delivering a network circuit-based product to a customer.

Returning to FIG. 3, system 100 may communicate with workflow systems 302 by way of a network 304. Network 304 may include one or more networks or types of networks capable of carrying communications and/or data signals between delivery management system 100 and workflow systems 302. For example, network 304 may include, but is not limited to, one or more wireless networks, broadband networks, closed media networks, cable networks, satellite networks, the Internet, intranets, local area networks, public networks, private networks, optical fiber networks, and/or any other networks capable of carrying data and communications signals between delivery management system 100 and workflow systems 302. Additionally or alternatively, delivery management system 100 may communicate directly one or more of workflow systems 302 with another without the use of network 304.

In some examples, delivery management system 100 and/or workflow systems 302 may each include or be in communication with a user access device configured to facilitate user access to and/or control of one or more operations performed by delivery management system 100 and/or workflow systems 302. For example, as shown in FIG. 3, delivery management system 100 may be communicatively coupled to a user access device 306. User access device 306 may be configured to present one or more GUIs provided by delivery management system 100 so that a user thereof (e.g., a delivery manager and/or another type of user) may interact with delivery management system 100. User access device 306 may include any suitable computing device such as, but not limited to, a personal computer, a communications device, a mobile device (e.g., a mobile phone or a tablet computer), a handheld device, and/or any other suitable computing device.

Figure 5:
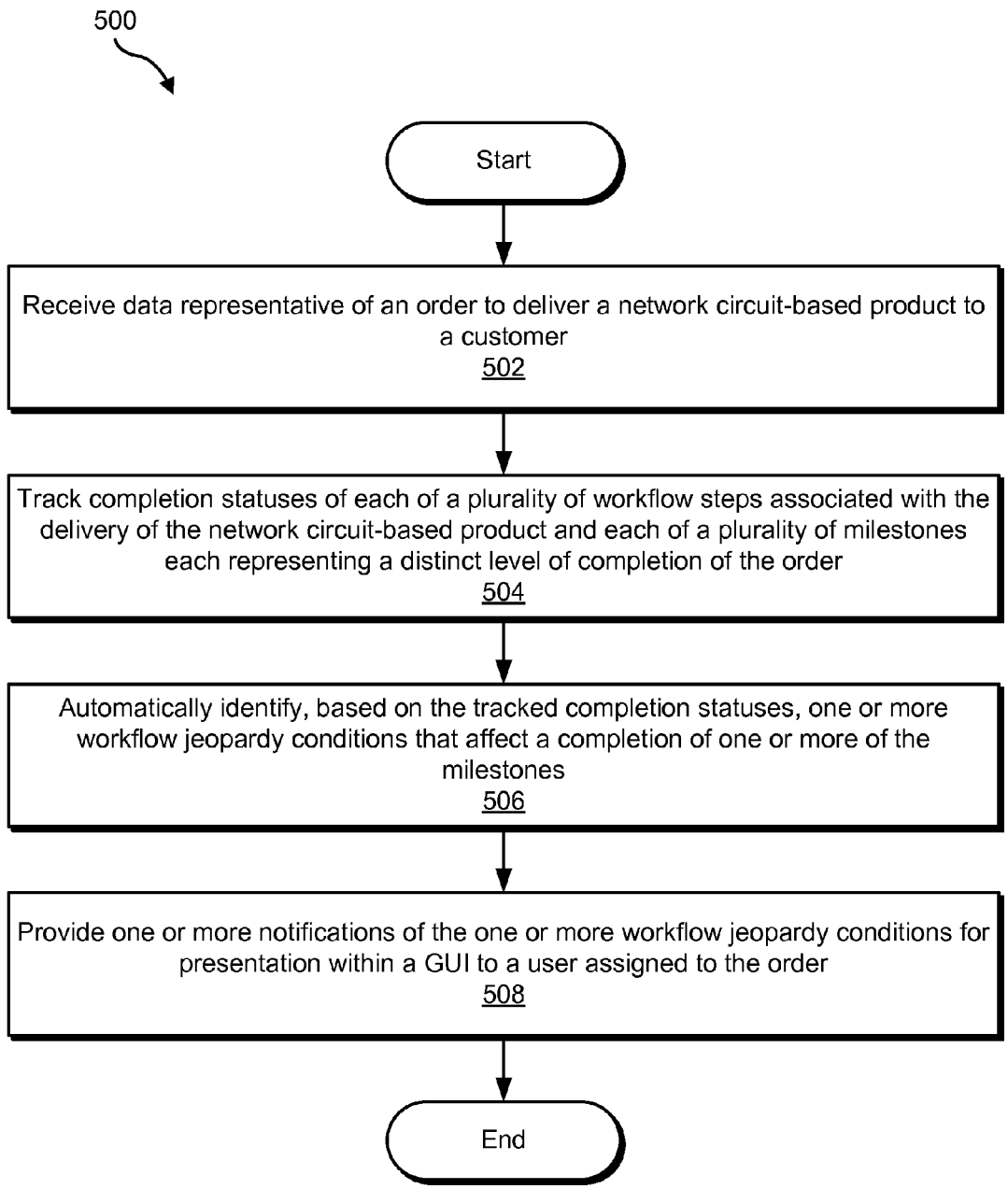
FIG. 5 illustrates an exemplary workflow-based delivery management method according to principles described herein.

FIG. 5 illustrates an exemplary workflow-based delivery management method 500. While FIG. 5 illustrates exemplary steps according to one embodiment, other embodiments may omit, add to, reorder, and/or modify any of the steps shown in FIG. 5. One or more of the steps shown in FIG. 5 may be performed by system 100 and/or any implementation thereof.

In step 502, a delivery management system receives data representative of an order to deliver a network circuit-based product to a customer. Step 502 may be performed in any of the ways described herein.

In step 504, the delivery management system tracks completion statuses of each of a plurality of workflow steps associated with the delivery of the network circuit-based product and each of a plurality of milestones each representing a distinct level of completion of the order. Step 504 may be performed in any of the ways described herein.

In step 506, the delivery management system automatically identifies, based on the tracked completion statuses, one or more workflow jeopardy conditions that affect a completion of one or more of the milestones. Step 506 may be performed in any of the ways described herein.

In step 508, the delivery management system provides one or more notifications of the one or more workflow jeopardy conditions for presentation within a GUI to a user assigned to the order. Step 508 may be performed in any of the ways described herein.

Various GUIs that may be provided for presentation by system 100 will now be described. It will be recognized that the GUIs described herein are merely illustrative of the many different GUIs that may be provided for presentation by system 100 in accordance with the methods and systems described herein.

Figure 6:
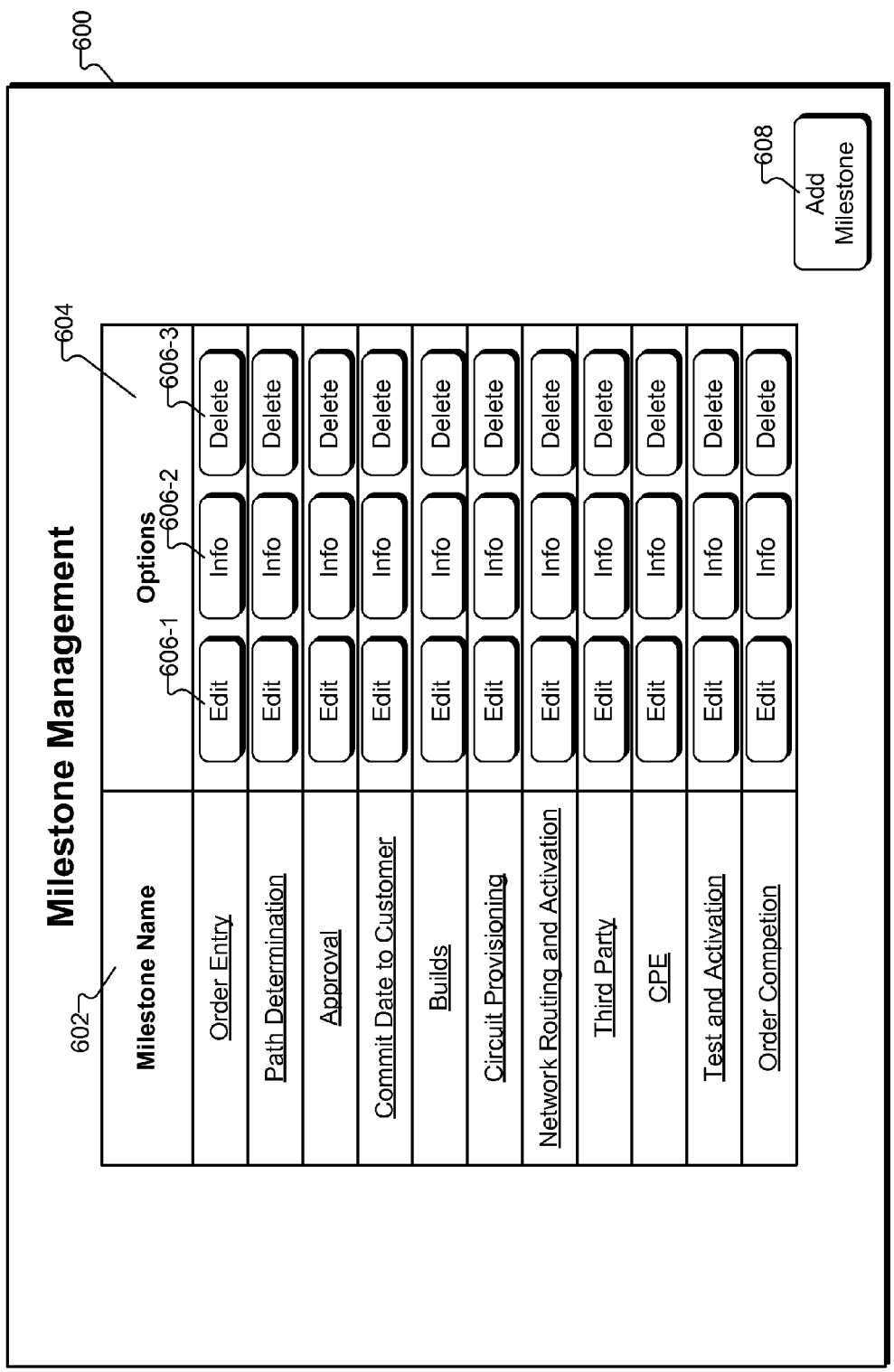

FIG. 6 shows an exemplary milestone management GUI 600 that may be provided by system 100 and configured to facilitate user management of one or more milestones. As shown, the names of various milestones (e.g., "Order Entry," "Path Determination," etc.) are shown in a first column 602 of GUI 600. Various selectable options (e.g., options 606-1 through 606-3) associated with each milestone may be presented within a second column 604 of GUI 600. For example, a user may select option 606-1 to edit one or more attributes of the milestone named "Order Entry," option 606-2 to view information associated with the milestone named "Order Entry," or option 606-3 to delete the milestone named "Order Entry." Additionally or alternatively, a user may select option 608 to add a new milestone to the list of milestones shown in GUI 600.

Figure 7:
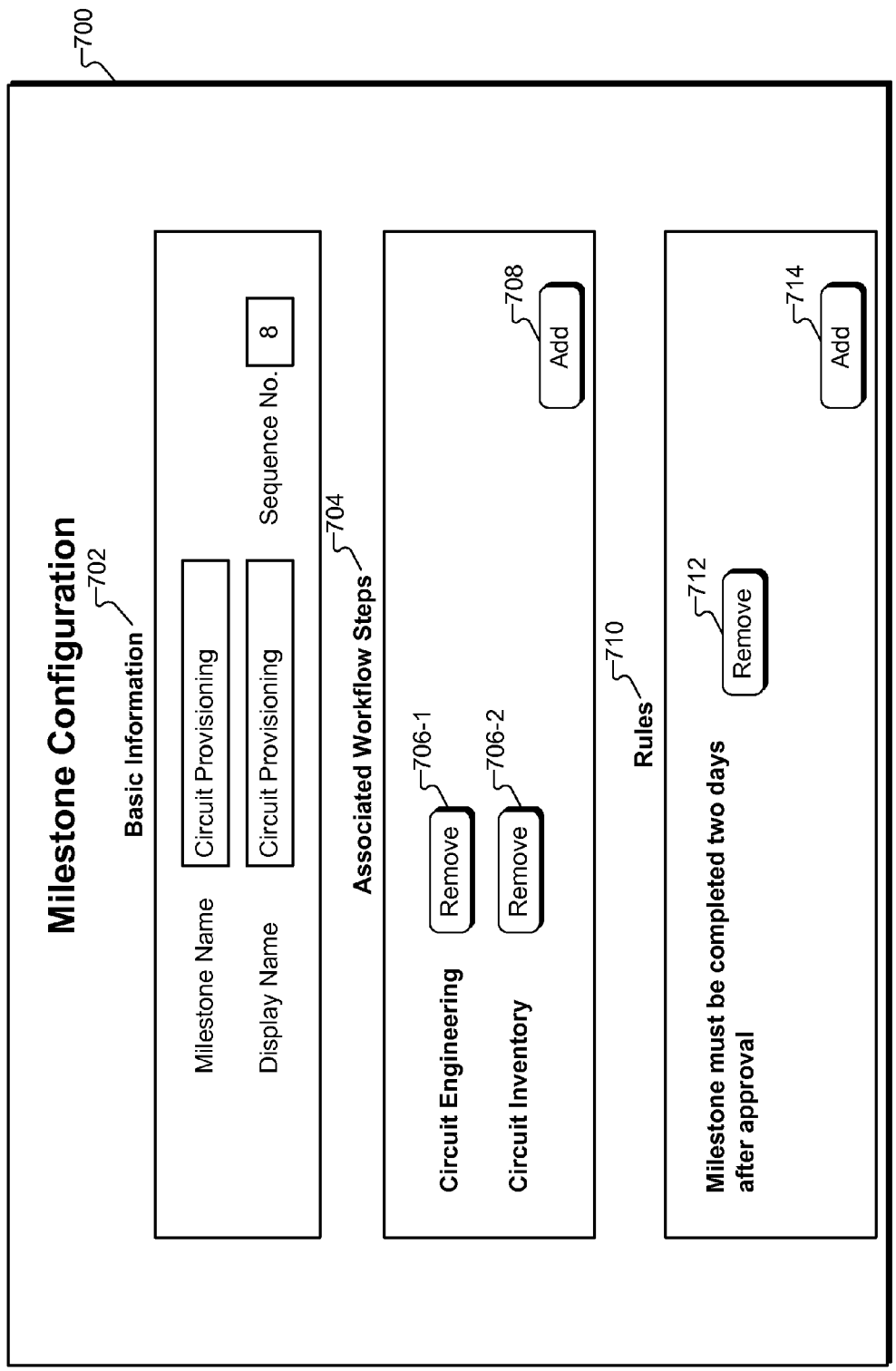

FIG. 7 shows an exemplary milestone configuration GUI 700 that may be provided by system 100 in response to a user selecting an option to edit a milestone named "circuit provisioning." As shown, GUI 700 may allow a user to configure or edit one or more attributes of the selected milestone. For example, a section within GUI 700 labeled "basic information" 702 may allow the user to modify basic information associated with the milestone by modifying a name of the milestone, a display name of the milestone, and/or a sequence number defining a relative position of the milestone with respect to the other milestones.

GUI 700 may also allow a user to manage an association of the milestone with one or more workflow steps. For example, a section labeled "associated workflow steps" 704 within GUI 700 may allow a user to view workflow steps that have already been associated with the milestone, remove one or more workflow steps from being associated with the milestone, and/or associate one or more workflow steps with the milestone. To illustrate, FIG. 7 shows that two workflow steps from FIG. 4 (i.e., circuit engineering step 402-5 and circuit inventory step 402-4) are currently associated with the "circuit provisioning" milestone. A user may remove either of these workflow steps from being associated with the "circuit provisioning" milestone by selecting "remove" options 706-1 and/or 706-2. The user may associate one or more other workflow steps with the "circuit provisioning" milestone by selecting "add" option 708.

GUI 700 may also allow a user to specify one or more rules associated with the milestone. For example, as shown in a section labeled "rules" 710, the user has specified a rule that the milestone must be completed two days after approval. The user may remove this rule by selecting "remove" option 712 and/or add one or more other rules by selecting "add" option 714. In some examples, system 100 may be configured to identify one or more jeopardy conditions that affect one or more milestones in accordance with the rules specified in rules section 710.

FIG. 8 shows an exemplary GUI 800 that may be provided by system 100 and configured to provide a detailed order view of a particular order assigned to a particular user. As shown, various types of information related to the order may be presented within a "view criteria" section 802 of GUI 800. A graphical representation of each of the milestones associated with the order may also be shown in a "milestones" section 804. As shown, each of the milestones specified in the milestone management GUI 600 may be presented within GUI 800 in the form of a pipeline view. It will be recognized that the milestones may be alternatively presented in any other manner as may serve a particular implementation.

As shown, a completion status of each of the milestones may also be indicated within GUI 800. The completion status of each of the milestones may be indicated in any suitable manner. To illustrate, milestones that have been fully completed may show a corresponding completion date in an associated completion field 806 (e.g., completion fields 806-1 through 806-11). For example, the "order entry" milestone has a completion date of September 2007 included in a completion field 806-1. Milestones that have been partially completed may include a "partial" label. For example, completion fields 806-2 and 806-8 indicate that the "path determination" and "third party" milestones have been partially completed. An empty completion field 806 may indicate that a corresponding milestone has not been completed at all. For example, completion field 806-3 is empty, thereby indicating that the "approval" milestone has not been completed at all.

Notifications of workflow jeopardy conditions affecting one or more milestones may also be provided within GUI 800. Such notifications may be in the form of one or more graphical symbols, text, and/or any other graphical object as may serve a particular implementation. For example, FIG. 8 shows that notifications 808-1 through 808-3 (collectively "notifications 808") in the form of graphical objects have been placed within GUI 800 to indicate a presence of one or more workflow jeopardy conditions affecting a completion of the "path determination," "third party," and "CPE" milestones. A user may readily note the presence of such notifications 808 and immediately determine that completion of one or more milestones is in jeopardy.

Figure 9:
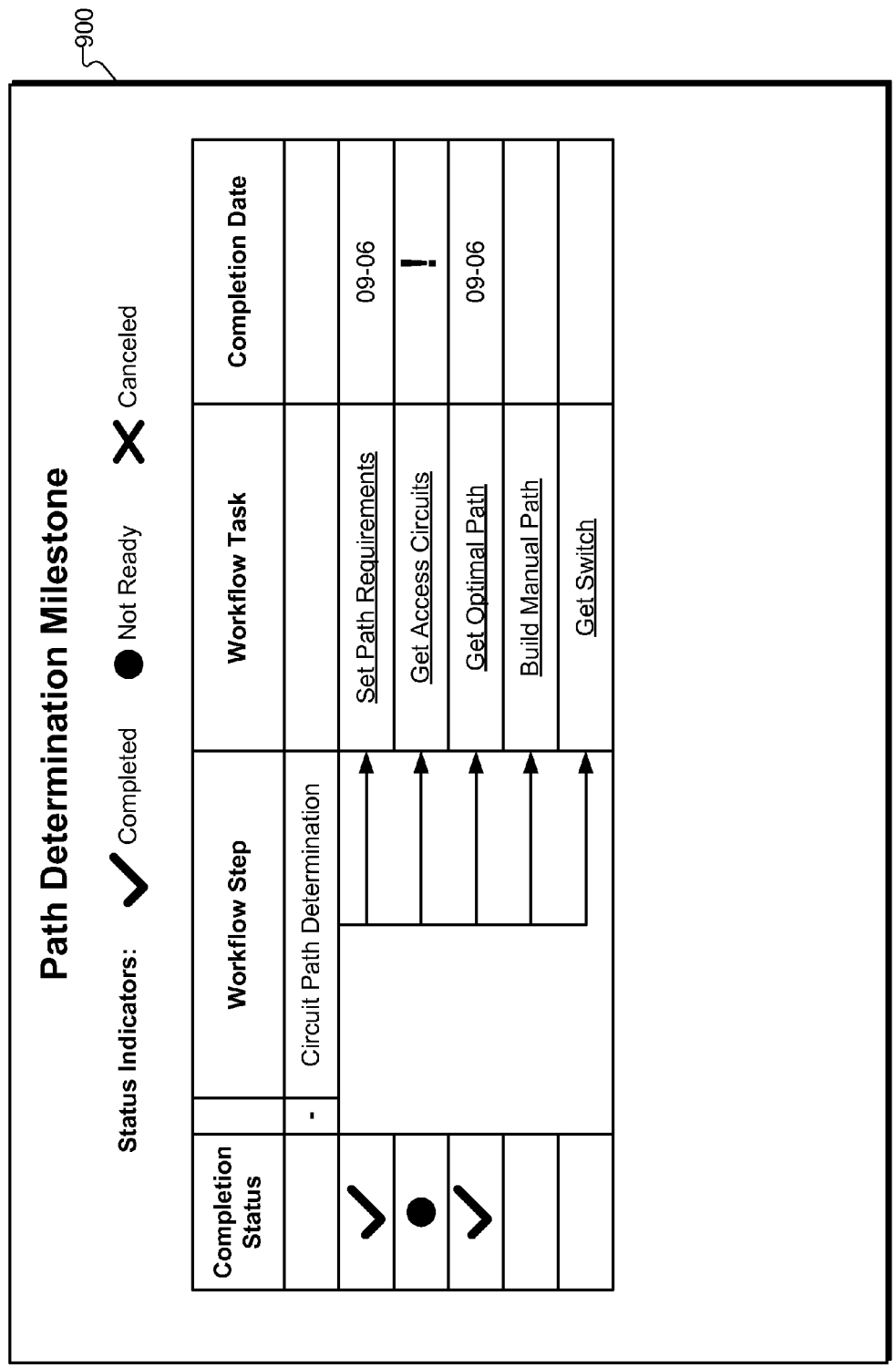

In some examples, a user may select a particular milestone and/or notification 800 to view additional information and/or options associated with the milestone and/or notification 800. For example, FIG. 9 shows a GUI 900 that may be provided for presentation in response to selection by a user of the "path determination" milestone shown in FIG. 8. As shown in FIG. 9, a workflow step and a plurality of workflow tasks associated with the "path determination" milestone may be presented within GUI 900 along with their corresponding completion statuses. As shown, the user may readily ascertain that the source of the workflow jeopardy condition affecting the "path determination" milestone is a workflow task named "get access circuits." The user may select this workflow task to access additional information associated with the workflow task and/or perform one or more operations to remedy the workflow jeopardy condition. For example, the user may select the workflow task to contact one or more people assigned to the workflow task, modify a target completion date associated with the workflow task, etc.

As mentioned, system 100 may provide a list of orders assigned to a particular user. For example, FIG. 10 shows an exemplary GUI 1000 that may be provided by system 100 and configured to present a list of orders 1002 assigned to a delivery manager. As shown, the list of orders 1002 may include an order number corresponding to each order, a network circuit identifier corresponding to each order, and a customer requested delivery date corresponding to each order. Additional or alternative information associated with each order may be presented within GUI 1000 as may serve a particular implementation.

In some examples, a user may select one of the orders included in the list of orders 1002 to access one or more notifications (i.e., alarms) associated with the selected order. For example, FIG. 11 shows an exemplary GUI 1100 that may be presented in response to a selection of an order having an order number of "123." It will be recognized that GUI 1100 may be additionally or alternatively presented in any other context.

As shown, GUI 1100 may show a list of alarms 1102 associated with the order. Each alarm may be associated with a particular workflow jeopardy condition that may affect completion of one or more milestones or workflow steps. As shown, the list of alarms 1102 may include various types of information associated with each alarm. A user may select an alarm (e.g., by selecting an alarm code associated with the alarm) to access additional information and/or options associated with the alarm. For example, the user may select an alarm to clear the alarm, contact one or more people in charge of one or more workflow tasks associated with the alarm, and/or perform any other action with respect to the alarm as may serve a particular implementation.

Figure 12:
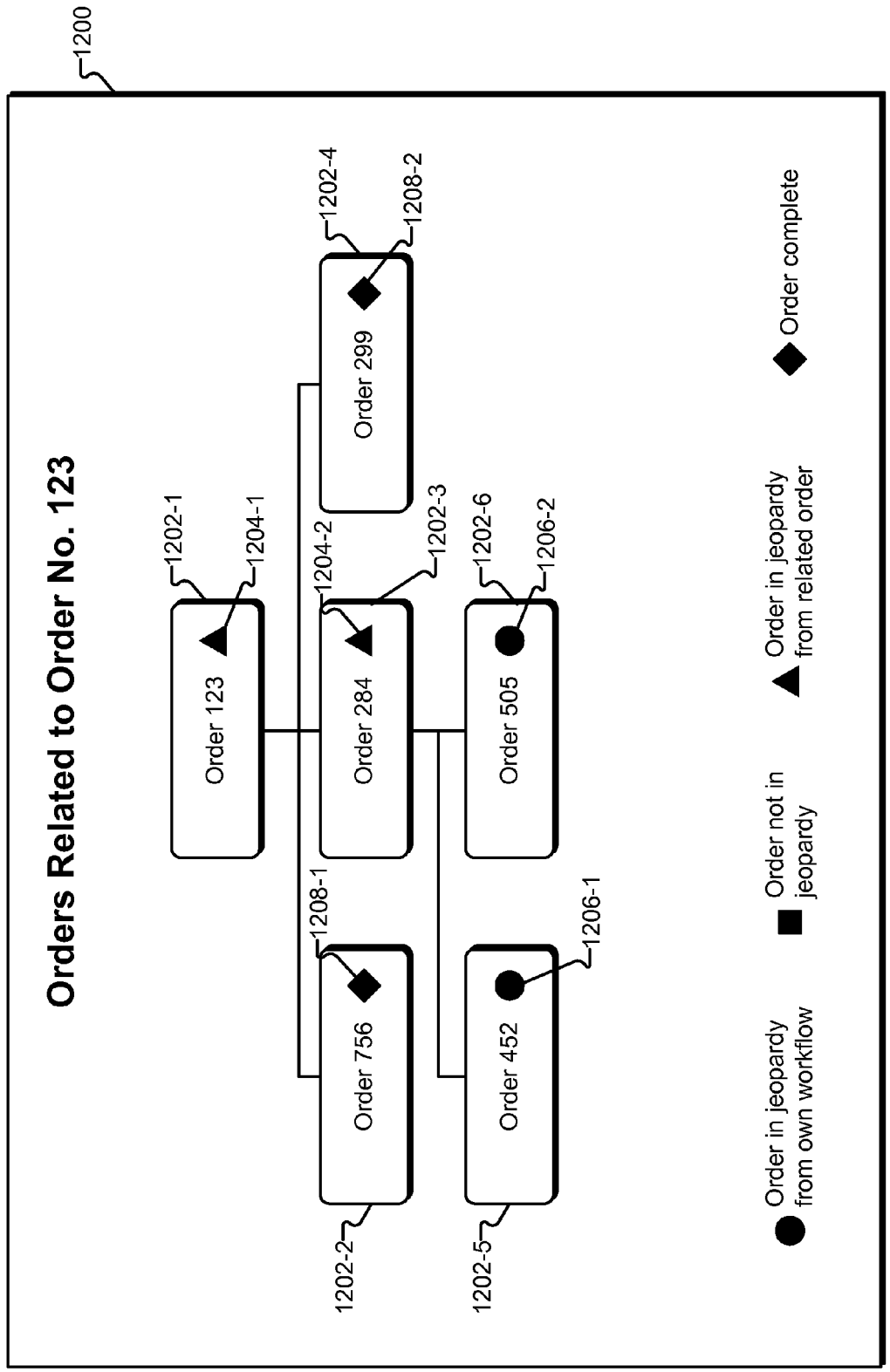

FIG. 12 shows an exemplary GUI 1200 that may be provided by system 100 and configured to provide a high level view of related orders. For example, GUI 1200 may include graphical objects 1202-1 through 1202-6 (collectively "graphical objects 1202") that each represent a particular order included in a group of related orders. Graphical objects 1202 may be interconnected in a manner that indicates how each order is related to one or more other orders. For example, graphical object 1202-1 is connected to graphical objects 1202-2 through 1202-4, thereby indicating that the order named "order 123" is related to the orders named "order 756," "order 284," and "order 299."

Notifications of workflow jeopardy conditions affecting one or more milestones associated with each order portrayed in GUI 1200 may also be provided within GUI 1200. For example, notifications 1204-1 and 1204-2 indicate that the orders named "order 123" and "order 284" are in jeopardy because of one or more workflow jeopardy conditions associated with one or more related orders. Notifications 1206-1 and 1206-2 indicate that the orders named "order 452" and "order 505" are in jeopardy because of one or more workflow jeopardy conditions within their own respective workflows. Notifications 1208-1 and 1208-2 indicate that the orders named "order 756" and "order 299" are complete.

Figure 13:
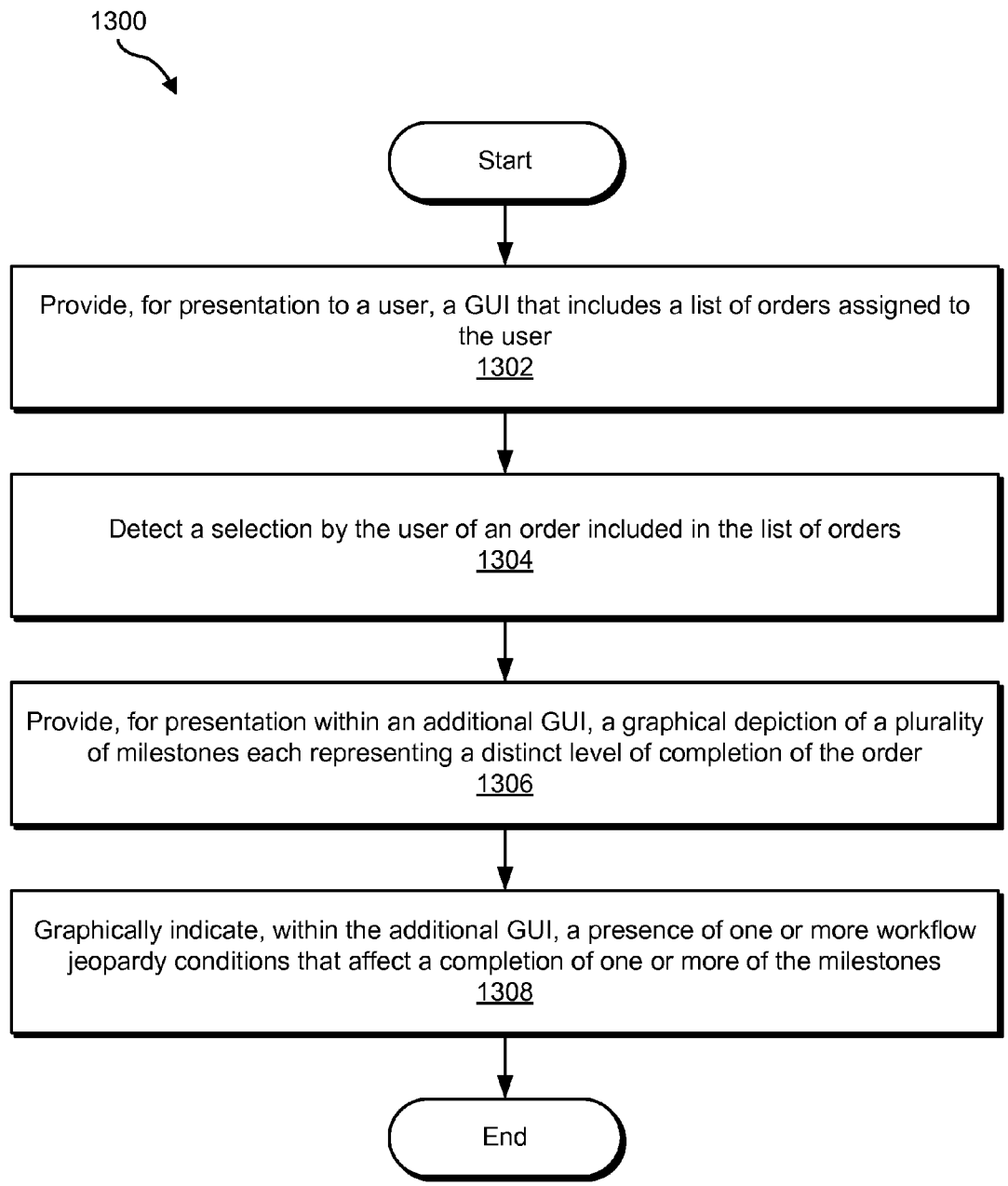
FIG. 13 illustrates another exemplary workflow-based delivery management method according to principles described herein.

FIG. 13 illustrates another exemplary workflow-based delivery management method 1300. While FIG. 13 illustrates exemplary steps according to one embodiment, other embodiments may omit, add to, reorder, and/or modify any of the steps shown in FIG. 13. One or more of the steps shown in FIG. 13 may be performed by system 100 and/or any implementation thereof.

In step 1302, a delivery management system provides, for presentation to a user, a GUI that includes a list of orders assigned to the user. The orders may be associated with a delivery of network circuit-based products to one or more customers. Step 1302 may be performed in any of the ways described herein.

In step 1304, the delivery management system detects a selection by the user of an order included in the list of orders. Step 1302 may be performed in any of the ways described herein.

In step 1306, the delivery management system provides, for presentation within an additional GUI, a graphical depiction of a plurality of milestones each representing a distinct level of completion of the order. Step 1306 may be performed in any of the ways described herein.

In step 1308, the delivery management system graphically indicates, within the additional GUI, a presence of one or more workflow jeopardy conditions that affect a completion of one or more of the milestones. Step 1308 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 14:
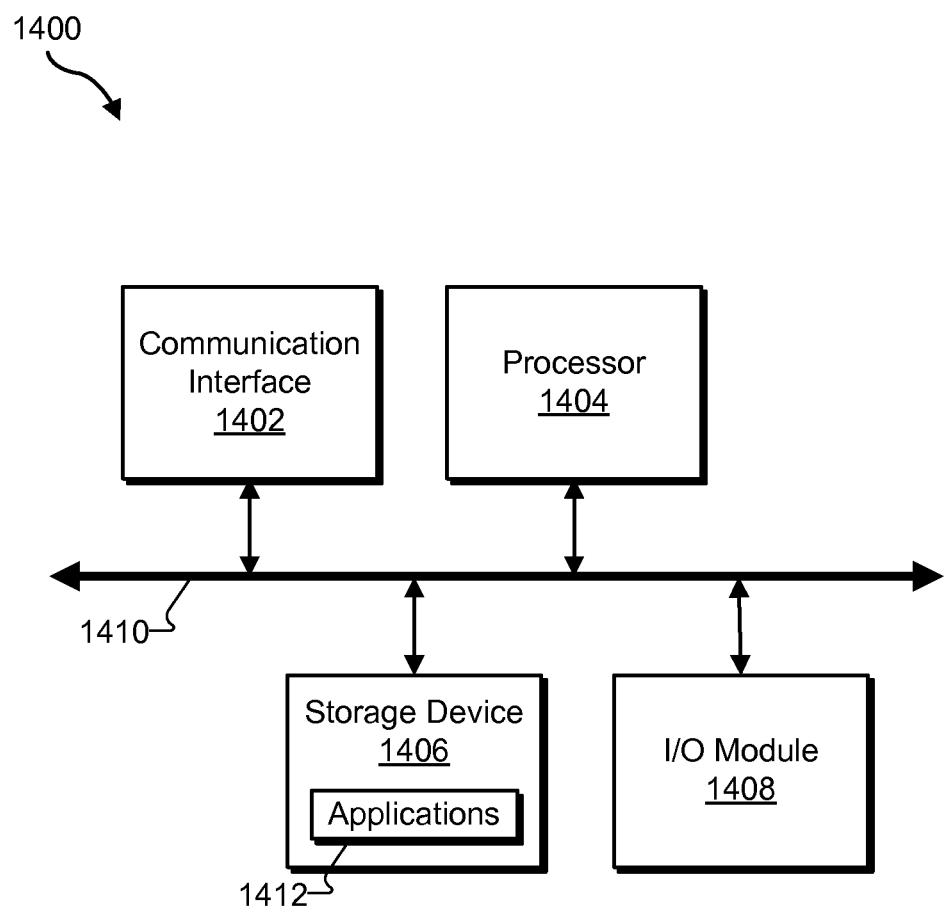
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with delivery management facility 102 and/or tracking facility 104. Likewise, storage facility 106 may be implemented by or within storage device 1406.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a delivery management system, data representative of an order to deliver a network circuit-based product to a customer;
   tracking, by the delivery management system, completion statuses of each of a plurality of workflow steps associated with the delivery of the network circuit-based product and each of a plurality of milestones each representing a distinct level of completion of the order;
   automatically identifying, by the delivery management system based on the tracked completion statuses, one or more workflow jeopardy conditions that affect a completion of one or more of the milestones; and
   providing, by the delivery management system, one or more notifications of the one or more workflow jeopardy conditions for presentation within a graphical user interface ("GUI") to a user assigned to the order,
   wherein the one or more workflow jeopardy conditions affect the completion of the one or more of the milestones by preventing the one or more of the milestones from being completed by at least one of a customer desired due date and a commit due date.

2. The method of claim 1, further comprising associating, by the delivery management system, each workflow step included in the plurality of workflow steps with a particular milestone included in the plurality of milestones such that the completion statuses of the plurality of milestones depend on the completion statuses of the workflow steps.

3. The method of claim 2, wherein the associating comprises associating multiple workflow steps included in the plurality of workflow steps with each milestone included in the plurality of milestones.

4. The method of claim 2, wherein the associating is performed in response to manual input provided by the user.

5. The method of claim 2, further comprising:
detecting, by delivery management system, one or more attributes of the order;
wherein the associating comprises automatically associating each workflow step with a particular milestone included in the plurality of milestones based on the detected one or more attributes of the order.

6. The method of claim 1, wherein:
the workflow steps each include one or more workflow tasks; and
the tracking of the completion statuses of each of the workflow steps and each of the milestones is performed by tracking a completion status of the one or more workflow tasks included in each of the workflow steps.

7. The method of claim 1, wherein the plurality of workflow steps comprise one or more workflow steps associated with a provisioning of a network circuit associated with the network circuit-based product.

8. The method of claim 7, wherein the plurality of workflow steps further comprise one or more workflow steps associated with an order entry workflow process associated with the order.

9. The method of claim 7, wherein the plurality of workflow steps further comprise one or more workflow steps associated with a post-provisioning workflow process associated with the order.

10. The method of claim 7, wherein the plurality of workflow steps further comprise one or more workflow steps associated with an additional order related to the order.

11. The method of claim 7, wherein the plurality of workflow steps further comprise one or more workflow steps associated with an external workflow process performed by a third party separate from a provider of the network circuit-based product.

12. The method of claim 1, wherein the one or more workflow jeopardy conditions comprise one or more workflow jeopardy conditions that have a potential to affect the completion of the one or more milestones subsequent to the identifying of the one or more workflow jeopardy conditions.

13. The method of claim 1, wherein the one or more workflow jeopardy conditions comprise one or more workflow jeopardy conditions that are actually affecting the completion of the one or more milestones at a time of the identifying of the one or more workflow jeopardy conditions.

14. The method of claim 1, further comprising providing, by the delivery management system, one or more GUIs configured to facilitate specification by the user of at least one of the one or more workflow jeopardy conditions.

15. The method of claim 1, further comprising:
detecting, by the delivery management system, a selection by the user of a notification included in the one or more notifications; and
providing, by the delivery management system, one or more options associated with the selected notification for presentation within another GUI.

16. The method of claim 1, further comprising providing, for presentation within the GUI, information associated with one or more additional orders related to the order.

17. The method of claim 1, further comprising providing, by the delivery management system within the GUI, a graphical representation of each of the milestones and an indication of the completion statuses of each of the milestones.

18. The method of claim 1, further comprising automatically assigning, by the delivery management system in response to the receiving, the order to the user based on one or more attributes of the order.

19. The method of claim 1, wherein the network circuit comprises a telecommunication circuit.

20. The method of claim 1, wherein the one or more workflow jeopardy conditions affect the completion of the one or more milestones by affecting a completion of one or more workflow steps associated with the one or more milestones.

21. The method of claim 1, embodied as computer-executable instructions on at least one non-transitory computer-readable medium.

22. A method comprising:
providing, by a delivery management system for presentation to a user, a graphical user interface ("GUI") that includes a list of orders assigned to the user, the orders associated with a delivery of network circuit-based products to one or more customers;
detecting, by the delivery management system, a selection by the user of an order included in the list of orders;
providing, by the delivery management system for presentation within an additional GUI, a graphical depiction of a plurality of milestones each representing a distinct level of completion of the order; and
graphically indicating, by the delivery management system within the additional GUI, a presence of one or more workflow jeopardy conditions that affect a completion of one or more of the milestones,
wherein the one or more workflow jeopardy conditions affect the completion of the one or more of the milestones by preventing the one or more of the milestones from being completed by at least one of a customer desired due date and a commit due date.

23. The method of claim 22, further comprising identifying, by the delivery management system, the presence of one or more workflow jeopardy conditions based on completion statuses of a plurality of workflow steps associated with the plurality of milestones.

24. A system comprising:
at least one computing device including a processor and comprising:
a delivery management facility configured to receive data representative of an order to deliver a network circuit-based product to a customer; and
a tracking facility communicatively coupled to the delivery management facility and configured to track completion statuses of each of a plurality of workflow steps associated with the delivery of the network circuit-based product and each of a plurality of milestones each representing a distinct level of completion of the order;
wherein the delivery management facility is further configured to
automatically identify, based on the tracked completion statuses, one or more workflow jeopardy conditions that affect a completion of one or more of the milestones by preventing the one or more of the milestones from being completed by at least one of a customer desired due date and a commit due date, and provide one or more notifications of the one or more workflow jeopardy conditions for presentation within a graphical user interface ("GUI") to a user assigned to the order.

* * * * *